(12) United States Patent
Hong

(10) Patent No.: US 12,082,009 B2
(45) Date of Patent: Sep. 3, 2024

(54) METHOD AND DEVICE FOR CELLULAR NETWORK SIGNAL MEASUREMENT

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 702 days.

(21) Appl. No.: 17/090,592

(22) Filed: Nov. 5, 2020

(65) Prior Publication Data
US 2021/0058806 A1 Feb. 25, 2021

Related U.S. Application Data

(63) Continuation of application No. PCT/CN2018/087555, filed on May 18, 2018.

(51) Int. Cl.
| | |
|---|---|
| *H04W 24/08* | (2009.01) |
| *B64C 39/02* | (2023.01) |
| *B64U 101/00* | (2023.01) |
| *H04W 24/10* | (2009.01) |

(52) U.S. Cl.
CPC ........... *H04W 24/08* (2013.01); *B64C 39/024* (2013.01); *B64U 2101/00* (2023.01); *H04W 24/10* (2013.01)

(58) Field of Classification Search
CPC . B64C 39/024; B64U 2101/00; H04W 24/08; H04W 24/10; H04W 24/02; H04W 4/02; H04W 4/20
See application file for complete search history.

(56) References Cited

U.S. PATENT DOCUMENTS

| | | |
|---|---|---|
| 2010/0074129 A1 | 3/2010 | Wang et al. |
| 2015/0014482 A1 | 1/2015 | Weierman et al. |
| 2016/0269917 A1* | 9/2016 | Hillegas, Jr. ......... H04B 17/336 |
| 2016/0309337 A1 | 10/2016 | Priest et al. |
| 2017/0048925 A1 | 2/2017 | Song et al. |
| 2018/0019516 A1 | 1/2018 | Teague |

(Continued)

FOREIGN PATENT DOCUMENTS

| | | |
|---|---|---|
| CN | 102281568 A | 12/2011 |
| CN | 102790983 A | 11/2012 |

(Continued)

OTHER PUBLICATIONS

CMCC R2-1803218 MDT-based air-borne UE identification Mar. 2018 (Year: 2018).*

(Continued)

*Primary Examiner* — Rina C Pancholi
(74) *Attorney, Agent, or Firm* — Oblon, McClelland, Maier & Neustadt, L.L.P.

(57) ABSTRACT

A method for cellular network signal measurement includes that: acquiring at least one set of measurement data collected during a flight of an unmanned aerial vehicle, each set of measurement data including a base station identifier and a signal quality parameter, and the base station identifier being an identifier of a base station for residing during collection of measurement data; and sending the at least one set of measurement data to the base station. A device for cellular network signal measurement is also provided.

19 Claims, 8 Drawing Sheets

(56) References Cited

U.S. PATENT DOCUMENTS

| | | | | |
|---|---|---|---|---|
| 2018/0292844 | A1* | 10/2018 | Kosseifi | G05D 1/0094 |
| 2020/0413267 | A1* | 12/2020 | Xue | H04W 24/02 |
| 2023/0103775 | A1* | 4/2023 | Gupta | H04W 64/00 |
| | | | | 455/456.1 |

FOREIGN PATENT DOCUMENTS

| | | |
|---|---|---|
| CN | 104053197 A | 9/2014 |
| CN | 104301967 A | 1/2015 |
| CN | 105792275 A | 7/2016 |
| CN | 106452821 A | 2/2017 |
| CN | 106454739 A | 2/2017 |
| CN | 106646485 A | 5/2017 |
| CN | 107040933 A | 8/2017 |
| CN | 107390040 A | 11/2017 |
| CN | 207232270 U | 4/2018 |
| WO | WO 2010/032940 A2 | 3/2010 |
| WO | WO 2018/009362 A2 | 1/2018 |

OTHER PUBLICATIONS

3GPP TS37.320 V 14.0.0 Radio measurement collection for minimization of drive tests (MDT) overall description Mar. 2017 (Year: 2017).*

Indian Office Action issued Dec. 13, 2021 in Indian Patent Application No. 202047053071 (with English translation), 7 pages.

Extended European Search Report issued Nov. 29, 2021 in European Patent Application No. 18919006.9, 11 pages.

"MDT-Based Air-Borne UE Identification" CMCC, 3GPP TSG-RAN WG2 Meeting #101bis R2-1805521 (Resubmission of R2-1803218), Sanya, China, Apr. 16-20, 2018, Agenda item: 9.18, XP051429172, Apr. 14, 2018, 3 pages.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 14)" 3GPP TS 37.320 V14.0.0 (Mar. 2017), XP051291475, Mar. 23, 2017, pp. 1-26.

"3rd Generation Partnership Project; Technical Specification Group Radio Access Network; Study on Minimization of drive- Tests in Next Generation Networks (Release 9)" 3GPP TR 36.805 V9.0.0 (Dec. 2009), XP055132083, Dec. 31, 2009, pp. 1-24.

"3rd Generation Partnership Project; Technical Specification Group Radio Access Network; Study on Enhanced LTE Support for Aerial Vehicles (Release 15)" 3GPP TR 36.777 V0.3.1 (Oct. 2017), XP051392661, Jan. 15, 2018, pp. 1-24.

Combined Chinese Office Action and Search Report issued Jan. 5, 2021 in corresponding Chinese Patent Application No. 201880000432.9 (with English Translation and English Translation of Category of Cited Documents) 15 pages.

English translation of the Written Opinion of the International Search Authority issued Feb. 20, 2019 in PCT/CN2018/087555, 4 pages.

Huawei, HiSilicon, "Measurement Report Mechanism for Drones", 3GPP TSG-RAN WG2 Meeting #99, R2-1708545, Aug. 25, 2017, 3 pages.

NTT DOCOMO, Inc., "Measurements Reporting Enhancements for UAV UE", 3GPP TSG-RAN2#99, R2-1709396, Aug. 25, 2017, 9 pages.

LG Electronics Inc., "Handover Support for Aerial UE", 3GPP TSG-RAN WG2 Meeting #99, R2-1709463, Aug. 25, 2017, 3 pages.

Huawei, HiSilicon; "Enhanced LTE Support for Aerial Vehicles", 3GPP TSG RAN Meeting #78 RP-172457, Dec. 18-21, 2017, 4 pages.

Combined Chinese Office Action and Search Report issued Jul. 30, 2021 in corresponding Chinese Patent Application No. 201880000432.9 (with English Translation) 16 pages.

CMCC,"MDT-based air-borne UE identification", 3GPP TSG-RAN WG2, Meeting #101, R2-1803218, Feb. 26-Mar. 2, 2018, 3 pages.

Intel Corporation, "Measurement reporting information for Aerial UE", 3GPP TSG RAN WG2 Meeting #101 R2-1802907, Athens, Greece, Feb. 2-Mar. 2, 2018, 4 pages.

Ericsson, "Proposal to progress LTE_Aerial-Core", 3GPP TSG-RAN WG2 #101bis Tdoc R2-1806347, Sanya, China, Apr. 16-20, 2018, 9 pages.

InterDigital Inc., "Measurement reporting enhancements for Aerials", 3GPP TSG-RAN WG2 Meeting #101 R2-1802806, Athens, Greece, Feb. 26-Mar. 2, 2018, 3 pages.

Jinsong, Peng et al., Application of UAV Airborne LiDAR Technology to Electric Power Industry, Bulletin of Surveying and Mapping No. 04, Apr. 25, 2018, (with English Abstract), pp. 152-154.

Min, Xu et al, Research on UAV Communications Based on Mobile Cellular Networks, Mobile Communications issue 22, Nov. 30, 2017 (with English Abstract), pp. 23-28.

Dr. Aamir Hussain et al., Development of 1553 Mux Bus Simulation Analysis Algorithm, Proceedings of 2012 9th International Bhurban Conference on Applied Sciences & Technology (IBCAST), Apr. 3, 2012, 4 pages.

International Search Report issued Feb. 20, 2019 in PCT/CN2018/087555, 2 pages.

* cited by examiner

METHOD AND DEVICE FOR CELLULAR NETWORK SIGNAL MEASUREMENT

CROSS-REFERENCE TO RELATED APPLICATION

This application is a U.S. continuation application of International Application No. PCT/CN 2018/087555, entitled "CELLULAR NETWORK SIGNAL MEASURING METHOD, DEVICE AND COMPUTER-READABLE STORAGE MEDIUM", filed on May 18, 2018, the disclosure of which is hereby incorporated by reference in its entirety.

TECHNICAL FIELD

The present disclosure relates to the technical field of cellular networks, and particularly, to a method and device for cellular network signal measurement and a computer-readable storage medium.

BACKGROUND

Drive test refers to work of measuring signal quality of a cellular network on a set line, thereby realizing a function of directly measuring and evaluating a performance index of the cellular network. Through drive test, an operator may implement corresponding optimization for problems of the cellular network.

Minimization of drive tests (MDT) is a drive test technology commonly used at present, and related parameters required for network optimization are mainly measured and reported through a mobile phone of a user.

SUMMARY

The present disclosure provides a method and device for cellular network signal measurement.

According to a first aspect of embodiments of the present disclosure, a method for cellular network signal measurement is provided, which is applied to an unmanned aerial vehicle (UAV) and includes that: at least one set of measurement data collected during a flight of the UAV is acquired, each of the at least one set of measurement data including a base station identifier and a signal quality parameter and the base station identifier being an identifier of a base station for residing during collection of the measurement data; and the at least one set of measurement data is sent to the base station.

According to a second aspect of the embodiments of the present disclosure, a method for cellular network signal measurement is provided, which may include that: at least one set of measurement data sent by a terminal device is received, each of the at least one set of measurement data including a base station identifier and a signal quality parameter and the base station identifier being an identifier of a base station where the terminal device resides during collection of the measurement data.

According to a third aspect of the embodiments of the present disclosure, a device for cellular network signal measurement is provided, which may include: a processor, configured to acquire at least one set of measurement data collected during a flight of a UAV, each of the at least one set of measurement data including a base station identifier and a signal quality parameter and the base station identifier being an identifier of a base station for residing during collection of the measurement data; and a transceiver, configured to send the at least one set of measurement data to the base station.

According to a fourth aspect of the embodiments of the present disclosure, a device for cellular network signal measurement is provided, which may include: a transceiver, configured to receive at least one set of measurement data from a terminal device, each of the at least one set of measurement data including a base station identifier and a signal quality parameter and the base station identifier being an identifier of a base station where the terminal device resides during collection of the measurement data.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

For conveniently understanding the technical solutions provided in the embodiments of the present disclosure, a cellular network signal measurement technology will be introduced and described at first below.

Drive test refers to work of measuring signal quality of a cellular network on a set line, thereby realizing a function of directly measuring and evaluating a performance index of the cellular network. Problems of the cellular network may be detected by drive test such that an operator may optimize the network for the problems of the cellular network. MDT is a drive test technology commonly used at present, and related parameters required for network optimization are mainly measured and reported through a mobile phone of a user. However, a conventional MDT solution is only for ground communication, which cannot implement detection of air network quality nor does help the operator to accurately discover and solve air network problems. The cellular network includes, but not limited to, a global system for mobile communications (GSM) network, a code division multiple access (CDMA) network, a frequency division multiple access (FDMA) network, a time division multiple access (TDMA) network, a 3rd-generation (3G) network, a 4th-generation (4G) network, a 5th-generation (5G) network and the like.

For implementing detection of air network quality, MDT may be combined with an unmanned aerial vehicle (UAV), namely a UAV with a cellular network communication function is adopted for cellular network signal measurement, to overcome the shortcomings of the conventional MDT solution.

Figure 1:
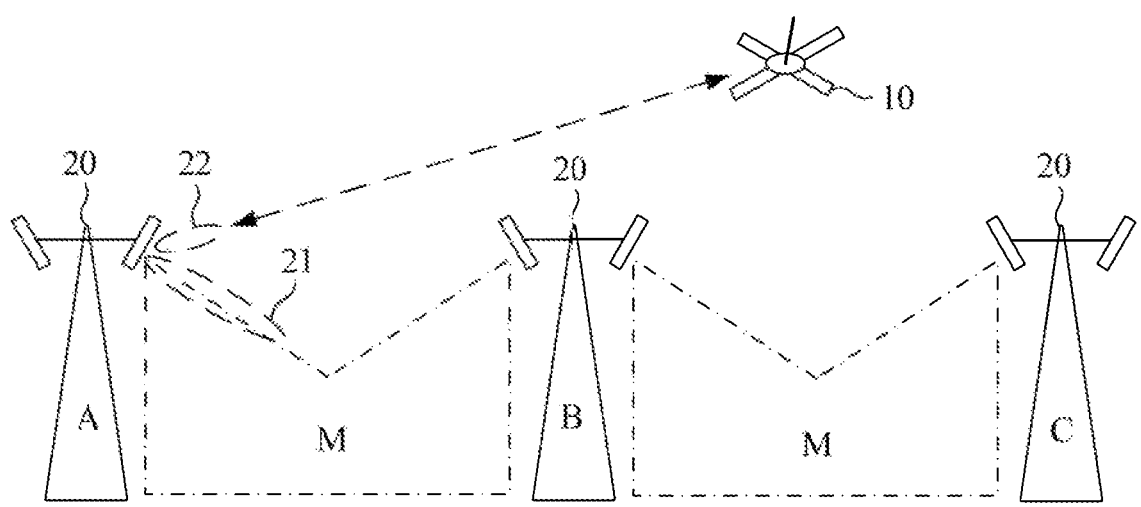
FIG. 1 is a structure diagram of a system for cellular network signal measurement according to an embodiment of the present disclosure.

FIG. 1 is a schematic diagram illustrating cellular network measurement through a UAV according to an embodiment of the present disclosure. As illustrated in FIG. 1, the UAV 10 is a UAV with a cellular network communication function in a cellular network. The UAV 10 may establish a wireless connection and communicate with a base station 20. In a process of communicating with the base station 20, the UAV 10 may perform network quality detection and report a detection result to the base station 20 such that the base station 20 may perform network optimization according to the detection result.

The UAV 10 is an unmanned aircraft operated by a radio remote control device and its own program control device. The UAV 10 may be an unmanned fixed-wing aircraft, an unmanned vertical take-off and landing aircraft, an unmanned airship, an unmanned helicopter, an unmanned multi-rotor aircraft or an unmanned parawing aircraft, etc.

In a present base station design, each base station 20 corresponds to a coverage area. At present, the coverage area of the base station 20 mainly refers to a coverage area of an antenna main lobe 21, and the coverage area of the antenna main lobe 21 is mainly a ground region, i.e., a region M (shown by the dotted line) in FIG. 1. The UAV 10 is mainly served by an antenna side lobe 22. Therefore, a condition that the UAV is located within a coverage of a base station 20 but the UAV 10 is served by an antenna side lobe 22 of an adjacent base station 20 may occur. As illustrated in FIG. 1, the UAV 10 is located within a coverage of a base station B, but the UAV 10 is served by an antenna side lobe 22 of a base station A.

Under the existence of the abovementioned condition, although a flight path of the UAV is designed according to the coverage range of the base station during cellular network signal measurement, because the UAV is mainly served by the antenna side lobe, a condition of access to different base stations in a coverage of a base station may occur, and consequently, the UAV reports network quality data of different base stations, as network quality data of the same base station, to the base station and network optimization of the base station is further influenced.

For solving problems in an existing process of performing cellular network measurement through a UAV, the embodiments of the present disclosure provide a method and device for cellular network signal measurement and a computer-readable storage medium. Details refer to the following embodiments.

Figure 2:
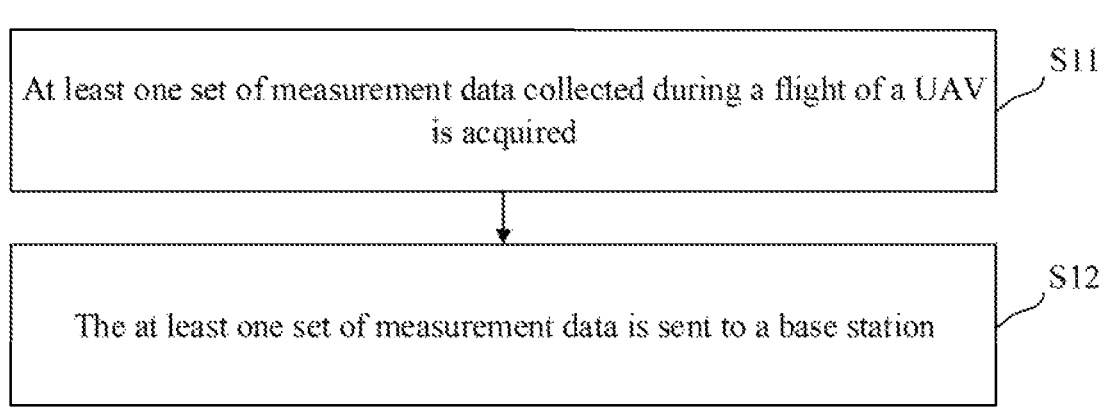
FIG. 2 is a flowchart of a method for cellular network signal measurement according to an embodiment of the present disclosure.

FIG. 2 is a flowchart of a method for cellular network signal measurement according to an embodiment of the present disclosure. The method is applied to a UAV and may be performed by a device for cellular network signal measurement in the UAV. As illustrated in FIG. 2, the method for cellular network signal measurement includes the following operations.

In S11, at least one set of measurement data collected during a flight of the UAV is acquired.

Each set of measurement data includes a base station identifier and a signal quality parameter. The base station identifier is an identifier of a base station for residing during collection of the corresponding measurement data, i.e., an identifier of a base station where the cellular network signal measurement device once or presently resides. The signal quality parameter may be a parameter such as reference signal receiving power (RSRP) and reference signal receiving quality (RSRQ).

In at least one alternative embodiment, each set of measurement data further includes at least one of a flight altitude or a geographical position. At least one of the flight altitude or the geographical position is carried in the measurement data, so that the base station may not only determine whether the base station has a coverage vulnerability or not but also further determine an orientation of the coverage vulnerability based on the flight altitude and the geographical position. The geographical position may be latitude and longitude information.

In the embodiment of the present disclosure, the device for cellular network signal measurement has a cellular network communication function and also has a height detection and positioning function. For example, the cellular network signal measurement device may be provided with a pressure-altitude sensor, and the pressure-altitude sensor determines the flight altitude based on detected air pressure. For another example, the cellular network signal measurement device may be provided with a global positioning system module or a Beidou navigation module for determining the geographical position of the UAV.

That is, the operation illustrated in S11 may include that: the parameter such as the RSRP and the RSRQ is detected according to a reference signal sent by the base station; the flight altitude of the UAV is detected through the pressure-altitude sensor; and the position of the UAV is detected through the global positioning system module or the Beidou navigation module.

A flight path of the UAV is preset. For example, multiple coordinate points (each coordinate point corresponds to a respective geographical position and altitude) are selected according to a coverage area of a side lobe of (one or more) base stations required to be measured, and then the multiple coordinate points are connected in series to form the flight path of the UAV. The flight altitude of the UAV usually does not exceed 120 m. The cellular network signal measurement device collects measurement data according to a predetermined period. The predetermined period may be specified by the base station, for example, collecting data once every minute. Of course, the predetermined period may also be pre-configured.

The device for cellular network signal measurement is further provided with a storage module, configured to store the collected measurement data. The measurement data is stored in sets. Each set of measurement data includes the base station identifier and the signal quality parameter corresponding to the base station identifier, and may further include at least one of the flight altitude or the geographical position. The cellular network signal measurement device, when storing the measurement data, may further store collection time corresponding to the measurement data, namely each set of measurement data may further include a collection time. The collection time refers to time when the cellular network signal measurement device collects the signal quality parameter.

In S12, the at least one set of measurement data is sent to the base station.

When the cellular network signal measurement device sends the measurement data to the base station, there may be multiple implementation manners. For example, all the collected measurement data is sent to the base station. Or, a plurality of sets of latest collected measurement data are sent to the base station, for example, 10 sets of latest collected measurement data are sent to the base station. Or, the measurement data collected within a determined period of time is sent to the base station, for example, measurement data collected within 30 minutes is sent to the base station.

In the embodiment of the present disclosure, drive test is performed by the UAV, and the measurement data transmitted to the base station by the UAV includes the base station identifier and the signal quality parameter, so that, even though the UAV accesses different base stations during the flight, the base station, when receiving the measurement data, may still accurately determine whether the measurement data is related to the base station or not according to the base station identifier contained in the measurement data and further perform network optimization according to the signal quality parameter related to the present base station.

In at least one alternative embodiment, the method may further include that: a terminal information request message (i.e., UEInformation Request) sent by the base station is received.

The operation of sending the at least one set of measurement data to the base station may include that: a terminal information response message is sent to the base station, the terminal information response message including the at least one set of measurement data.

In the embodiments of the present disclosure, the UAV, after collecting the measurement data, receives the terminal information request message from the base station and sends the measurement data through the terminal information response message to the base station. In this way, the measurement data is transmitted through RRC signaling. The implementation manner is simple, and in addition, the information security may be ensured.

In at least one alternative embodiment, the method may further include that: before receiving the terminal information request message from the base station, indication information is sent to the base station. The indication information indicates that the UAV has collected the at least one set of measurement data.

In this implementation, before receiving the terminal information request message from the base station, the indication information is sent to the base station to notify the base station that the UAV has collected the at least one set of measurement data, and the base station, when receiving the indication information, may send the terminal information request message to the UAV to complete uploading of the measurement data, so that the base station is prevented from repeatedly sending the terminal information request message.

In at least one alternative embodiment, the operation of sending the indication information to the base station may include that: an RRC connection setup complete message (i.e., RRCConnectionSetupComplete) carrying the indication information is sent to the base station.

In the embodiment of the present disclosure, the indication information is transmitted through the RRC connection setup complete message, so that convenience for implementation is ensured.

In at least one alternative embodiment, the method may further include that: a logged measurement configuration message (i.e., LoggedMeasurementConfiguration) sent by the base station is received, the logged measurement configuration message indicating a configuration parameter for MDT in a cellular network; and the measurement data is collected according to the configuration parameter indicated through the logged measurement configuration message.

In the implementation, the base station sends the configuration parameter for collection of the measurement data to the UAV through the logged measurement configuration message such that the UAV may perform signal collection according to the configuration parameter.

In at least one alternative embodiment, the configuration parameter includes data required to be collected and data required to be uploaded to the base station.

The data required to be collected and the data required to be uploaded to the base station may be different. For example, the data required to be collected includes the signal quality parameter, the flight altitude and the geographical position, and the data required to be uploaded to the base station includes the base station identifier, the signal quality parameter and the geographical position.

In at least one alternative embodiment, the method further includes that: terminal capability information (i.e., UE capability information) is sent to the base station, the terminal capability information indicating that the UAV has an MDT function.

The terminal capability information is reported to the base station such that the base station may determine that the cellular network signal measurement device can perform cellular network signal measurement, so as to configure parameters of the cellular network signal measurement device.

It is to be noted that operations illustrated in S11 to S12 and the abovementioned optional operations may be freely combined.

Figure 3:
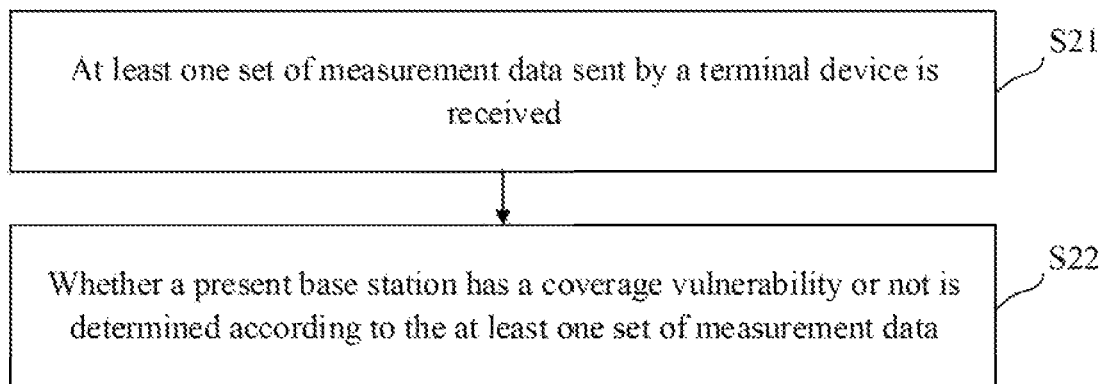
FIG. 3 is a flowchart of a method for cellular network signal measurement according to an embodiment of the present disclosure.

FIG. 3 is a flowchart of a method for cellular network signal measurement according to an embodiment of the present disclosure. The method may be executed by a base station (for example, an evolved node B (eNodeB). As illustrated in FIG. 3, the method for cellular network signal measurement includes the following operations.

In S21, at least one set of measurement data sent by a terminal device is received.

Each set of measurement data includes a base station identifier and a signal quality parameter. The base station identifier is an identifier of a base station where the terminal device resides during collection of the corresponding measurement data. The terminal device is the device for cellular network signal measurement in the abovementioned UAV.

In at least one alternative embodiment, each set of measurement data further includes at least one of a flight altitude or a geographical position.

In S22, whether the present base station has a coverage vulnerability or not is determined according to the at least one set of measurement data.

S22 is an optional step. The operation may also be executed by another network entity, for example, another base station or a trace collection entity (TCE).

In at least one alternative embodiment, the base station may determine whether the base station has the coverage vulnerability or not according to the following manner:

the base station screens out the measurement data that contains its own base station identifier at first; and then screens out the measurement data whose signal quality parameter value is less than a set value among the measurement data that contains its own base station identifier. When there are multiple sets of measurement data of which the signal quality parameter values are less than the set value, it may be determined that the base station has the coverage vulnerability.

Furthermore, when a flight path is formed by connecting multiple coordinate points within a coverage area of a side lobe of die present base station in series, the step may include that: the base station screens out measurement data containing base station identifiers of other base stations; and when the amount of the measurement data containing the base station identifiers of the other base stations exceeds a set proportion, it is indicated that signal quality of the present base station within the coverage area is lower than that of the other base stations and the base station has the coverage vulnerability.

Furthermore, when the measurement data further includes the flight altitude and the geographical position, the step may include that:

measurement data in the coverage area of the base station (side lobe) is screened out according to the flight altitude and geographical position in the measurement data, and if the base station identifier in the measurement data is the base station identifier of the base station and the value of signal quality parameter is less than the set value, or the base station identifier in the measurement data is a base station identifier of another base station, it is determined that the coverage has the coverage vulnerability.

Figure 4:
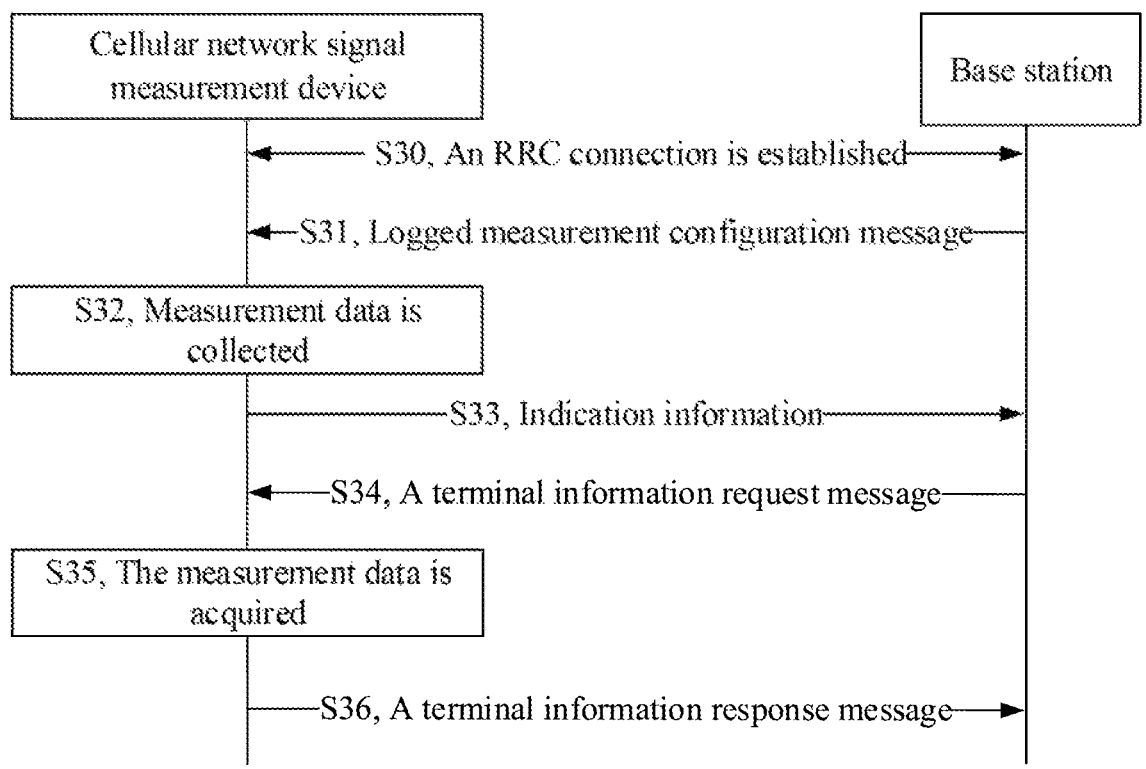
FIG. 4 is a flowchart of a method for cellular network signal measurement according to an embodiment of the present disclosure.

FIG. 4 is a flowchart of a method for cellular network signal measurement according to an embodiment of the present disclosure. The method is executed by both a cellular network signal measurement device in a UAV and a base station. As illustrated in FIG. 4, the method for cellular network signal measurement includes the following operations.

In S30, the cellular network signal measurement device establishes a radio resource control (RRC) connection with the base station.

The operation illustrated in S30 may include:

a first step, RRC connection request: the cellular network signal measurement device sends an RRC connection request (RRCConnectionRequest) message to the base station;

a second step, RRC connection setup: the base station sends an RRC connection setup (RRCConnectionSetup) message to the cellular network signal measurement device; and a third step, RRC connection setup complete: the cellular network signal measurement device sends an RRC connection setup complete (RRCConnectionSetupComplete) message to the base station.

In S31, the base station sends a logged measurement configuration message (LoggedMeasurementConfiguration) to the cellular network signal measurement device, the logged measurement configuration message indicating a configuration parameter for MDT in a cellular network, and the cellular network signal measurement device receives the logged measurement configuration message from the base station.

The logged measurement configuration message is LoggedMeasurementConfiguration in RRC signaling.

The configuration parameter includes data required to be collected and data required to be uploaded to the base station. The data required to be collected and the data required to be uploaded to the base station may be different. For example, the data required to be collected includes a signal quality parameter, a flight altitude and a geographical position, and the data required to be uploaded to the base station includes a base station identifier, the signal quality parameter and the geographical position.

In at least one alternative embodiment, the configuration parameter may further include: a job type of MDT, the job type in the present disclosure being logged MDT only; an area scope, including two types: one being a cell and the other being a tracking area; a list of measurements, defining a content of the signal quality parameter, for example, the signal quality parameter is RSRP or RSRQ; a reporting trigger, one being periodic reporting and the other being event-triggered reporting; a logging interval: and a logging duration, etc.

The logged measurement configuration message is transmitted when the cellular network signal measurement device and the base station are in an RRC connected state. For example, after the RRC connection is established, the cellular network signal measurement device notifies the base station that it has an MDT function at first, and then the base station sends the logged measurement configuration message to the cellular network signal measurement device.

The operation that the cellular network signal measurement device notifies the base station that it has the MDT function at first may include that:

terminal capability information (i.e., UE capability information) is sent to the base station, the terminal capability information indicating that the UAV has the MDT function. The terminal capability information is reported to the base station such that the base station may determine that the cellular network signal measurement device can perform cellular network signal measurement and further perform parameter configuration on the cellular network signal measurement device.

The terminal capability information may be implemented through a terminal-evolved universal mobile telecommunications system terrestrial radio access capability message (UE-EUTRA-Capability) in the RRC signaling in the RRC connected state. For example, it may be reported through an information unit of other parameters in the UE-EUTRA-Capability message.

In S32, the cellular network signal measurement device collects measurement data according to the configuration parameter indicated through the logged measurement configuration message.

The configuration parameter is transmitted when the cellular network signal measurement device is in the RRC connected state. After receiving the logged measurement configuration message, the cellular network signal measurement device stores the configuration parameter. When the cellular network signal measurement device is in an idle suite, measurement is performed according to the configuration parameter.

In the embodiment of the present disclosure, the cellular network signal measurement device has a cellular network communication function and also has a height detection and positioning function. For example, the cellular network signal measurement device may be provided with a pressure-altitude sensor, and the pressure-altitude sensor determines the flight altitude based on detected air pressure. For another example, the cellular network signal measurement device may be provided with a global positioning system module or a Beidou navigation module for determining the geographical position of the UAV. The geographical position may be latitude and longitude information.

That is, the operation illustrated in S32 may include that: the parameter such as the RSRP and the RSRQ is detected according to a reference signal sent by the base station; the flight altitude of the UAV is detected through the pressure-altitude sensor; and the position of the UAV is detected through the global positioning system module or the Beidou navigation module.

A flight path of the UAV is preset. For example, multiple coordinate points are selected according to a coverage area of a side lobe of (one or more) base stations required to be measured, and then the multiple coordinate points are connected in series to form the flight path of the UAV. The flight altitude of the UAV usually does not exceed 120 m. The cellular network signal measurement device collects the measurement data according to periodic time indicated through the logged measurement configuration message, for example, collecting data once every minute.

The cellular network signal measurement device is further provided with a storage module, configured to store the collected measurement data. The measurement data is stored in sets. Each set of measurement data includes a base station identifier and a signal quality parameter corresponding to the base station identifier, and may further include at least one of the flight altitude or the geographical position. The cellular network signal measurement device, when storing the measurement data, may further store collection time corresponding to the measurement data, namely each set of measurement data may further include a collection time. The collection time refers to time when the cellular network signal measurement device collects the signal quality parameter, and for example, is represented with a timestamp, and the timestamp may be a relative timestamp relative to a transmission time point of the configuration parameter.

In S33, the cellular network signal measurement device sends indication information to the base station, the indication information indicating that the UAV has collected at least one set of measurement data, and the base station receives the indication information from the cellular network signal measurement device.

The cellular network signal measurement device may send an RRC connection setup complete message (i.e., RRCConnectionSetupComplete) to the base station, the RRC connection setup complete message including the indication information, namely the indication information is contained in the RRC connection setup complete message.

For carrying the indication information in the RRC connection setup complete message, a field for carrying the indication information is designed in the RRC connection setup complete message. A binary bit may be adopted for indication. For example, if a value of the binary bit is 1, it is indicated that the UAV has collected the at least one set of measurement data, otherwise the value of the binary bit is set to be 0.

It is to be noted that the cellular network signal measurement device establishes the RRC connection with the base station in S30, and in the RRC connected state, the base station completes measurement configuration of the cellular network signal measurement device through S31. After the measurement configuration is completed, no data is transmitted between the cellular network signal measurement device and the base station, and the cellular network signal measurement device enters an RRC idle state and completes collection of the measurement data through S32 in the RRC idle state. Then, the cellular network signal measurement device reestablishes an RRC connection with a base station (the two accessed base stations may be the same and may also be different), indicates the base station that the UAV has collected the at least one set of measurement data through the RRC connection setup complete message in a connection establishment process and completes transmission of the measurement data in a subsequent process (in the RRC connected state).

The base stations corresponding to the two RRC connections established by the cellular network signal measurement device may be the same and may also be different.

In S34, the base station sends a terminal information request (UEInformationRequest) message to the cellular network signal measurement device, and the cellular network signal measurement device receives the terminal information request message from the base station.

The terminal information request message is used for requesting the cellular network signal measurement device for the measurement data.

In S35, the cellular network signal measurement device acquires at least one set of measurement data collected in a flight process of the UAV.

The cellular network signal measurement device, when sending the measurement data to the base station, may select measurement data to be sent to the base station through multiple implementation manners, namely the at least one set of measurement data includes multiple implementations:

for example, all collected measurement data; or, a plurality of sets of latest collected measurement data, for example, 10 sets of latest collected measurement data are sent to the base station; or, measurement data collected within a determined period of time, for example, measurement data collected within 30 minutes is sent to the base station; or measurement data with a base station identifier corresponding to a base station that the RRC connection is presently established with.

In S36, the cellular network signal measurement device sends a terminal information response (UEInformationResponse) message to the base station, the terminal information response message including the at least one set of measurement data, and the base station receives the terminal information response message from the cellular network signal measurement device.

Both the terminal information request message and the terminal information response message are RRC signaling. After the measurement data is collected, the measurement data is uploaded to the base station through the RRC signaling. The implementation manner is simple, and in addition, the information security may be ensured.

The base station, after receiving the terminal information response message from the cellular network signal measurement device, may perform network optimization according to the at least one set of measurement data. For example, the base station may learn a specific direction where a coverage vulnerability exists in the flight path of the UAV according to the measurement data and further perform coverage blind compensation according to the determined coverage vulnerability.

In at least one alternative embodiment, the base station may determine whether the present base station has the coverage vulnerability or not according to the following manner:

the base station screens out the measurement data that contains its own base station identifier at first; and the base station screens out measurement data of which the signal quality parameter value is less than a set value among the measurement data that contains its own base station identifier. When there are multiple sets of measurement data of which the signal quality parameter values are less than the set value, it may be determined that the base station has the coverage vulnerability.

Furthermore, when a flight path is formed by connecting multiple coordinate points within a coverage area of a side lobe of the present base station in series, the step may include that: the base station screens out measurement data containing base station identifiers of other base stations; and when the amount of the measurement data containing the base station identifiers of the other base stations exceeds a set proportion, it is indicated that signal quality of the present base station within the coverage area is lower than that of the other base stations and the base station has the coverage vulnerability.

Furthermore, when the measurement data further includes the flight altitude and the geographical position, the step may include that:

measurement data in the coverage area of the base station (side lobe) is screened out according to the flight altitude and geographical position in the measurement data, and if the base station identifier in the measurement data is the base station identifier of the base station and the value of signal quality parameter is less than the set value, or the base station identifier in the measurement data is a base station identifier of another base station, it is determined that the coverage has the coverage vulnerability.

It is to be noted that S32 to S36 are periodically executed.

Figure 5:
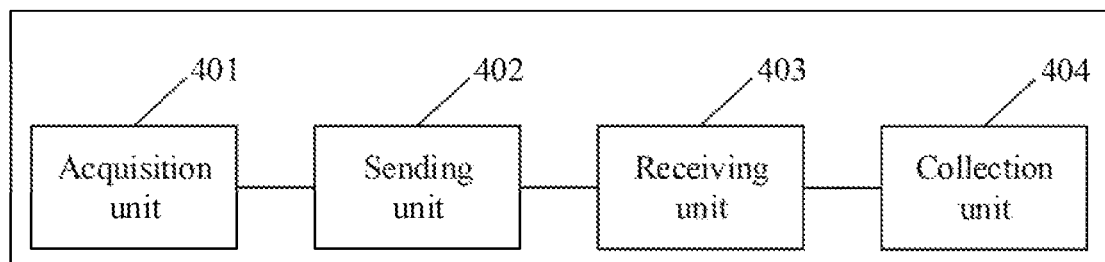
FIG. 5 is a structure diagram of a device for cellular network signal measurement according to an embodiment of the present disclosure.

FIG. 5 is a structure diagram of a device for cellular network signal measurement according to an embodiment of the present disclosure. The device for cellular network signal measurement is applied to a UAV. As illustrated in FIG. 5, the device for cellular network signal measurement includes an acquisition unit 401 and a sending unit 402.

The acquisition unit 401 is configured to acquire at least one set of measurement data collected during a flight of a UAV, each of the at least one set of measurement data including a base station identifier and a signal quality parameter. The base station identifier is an identifier of a base station for residing during collection of the corresponding measurement data. The sending unit 402 is configured to send the at least one set of measurement data to the base station.

In an implementation of the present disclosure, each of the at least one set of measurement data further includes at least one of a flight altitude or a geographical position.

In another implementation of the present disclosure, the device further includes: a receiving unit 403, configured to receive a terminal information request message from the base station. The sending unit 402 is configured to send a terminal information response message to the base station, the terminal information response message including the at least one set of measurement data.

In another implementation of the present disclosure, the sending unit 402 is further configured to, before the terminal information request message sent by the base station is received, send indication information to the base station, the indication information indicating that the UAV has collected the at least one set of measurement data.

In another implementation of the present disclosure, the sending unit 402 is configured to send an RRC connection setup complete message carrying the indication information to the base station.

In another implementation of the present disclosure, the receiving unit 403 is configured to receive a logged measurement configuration message from the base station, the logged measurement configuration message indicating a configuration parameter for MDT in a cellular network.

The device further includes a collection unit 404, configured to collect the measurement data according to the configuration parameter indicated through the logged measurement configuration message.

In another implementation of the present disclosure, the configuration parameter includes data required to be collected and data required to be uploaded to the base station.

In another implementation of the present disclosure, the sending unit 402 is further configured to send terminal capability information to the base station, the terminal capability information indicating that the UAV has an MDT function.

A manner in which the acquisition unit 401 acquires the measurement data may refer to S35. A manner in which the sending unit 402 sends the measurement data may refer to S36. A manner in which the receiving unit 403 receives the terminal information request message may refer to S34. A manner in which the collection unit 404 collects the measurement data may refer to S32. Detailed descriptions are omitted herein.

Figure 6:
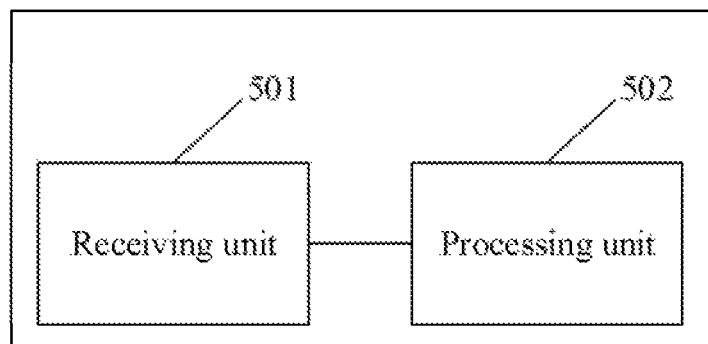
FIG. 6 is a structure diagram of a device for cellular network signal measurement according to an embodiment of the present disclosure.

FIG. 6 is a structure diagram of a device for cellular network signal measurement according to an embodiment of the present disclosure. As illustrated in FIG. 6, the device for cellular network signal measurement includes a receiving unit 501.

The receiving unit 501 is configured to receive at least one set of measurement data from a terminal device, each of the at least one set of measurement data including a base station identifier and a signal quality parameter and the base station identifier being an identifier of a base station where the terminal device resides during collection of the measurement data.

In an implementation of the present disclosure, each of the at least one set of measurement data further includes at least one of a flight altitude or a geographical position.

In another implementation of the present disclosure, the device further includes, a processing unit 502, configured to determine whether a present base station has a coverage vulnerability or not according to the at least one set of measurement data.

A manner in which the receiving unit 501 receives the measurement data may refer to S36. A manner in which the processing unit 502 determines whether the present base station has the coverage vulnerability or not may refer to S36. Detailed descriptions are omitted herein.

Figure 7:
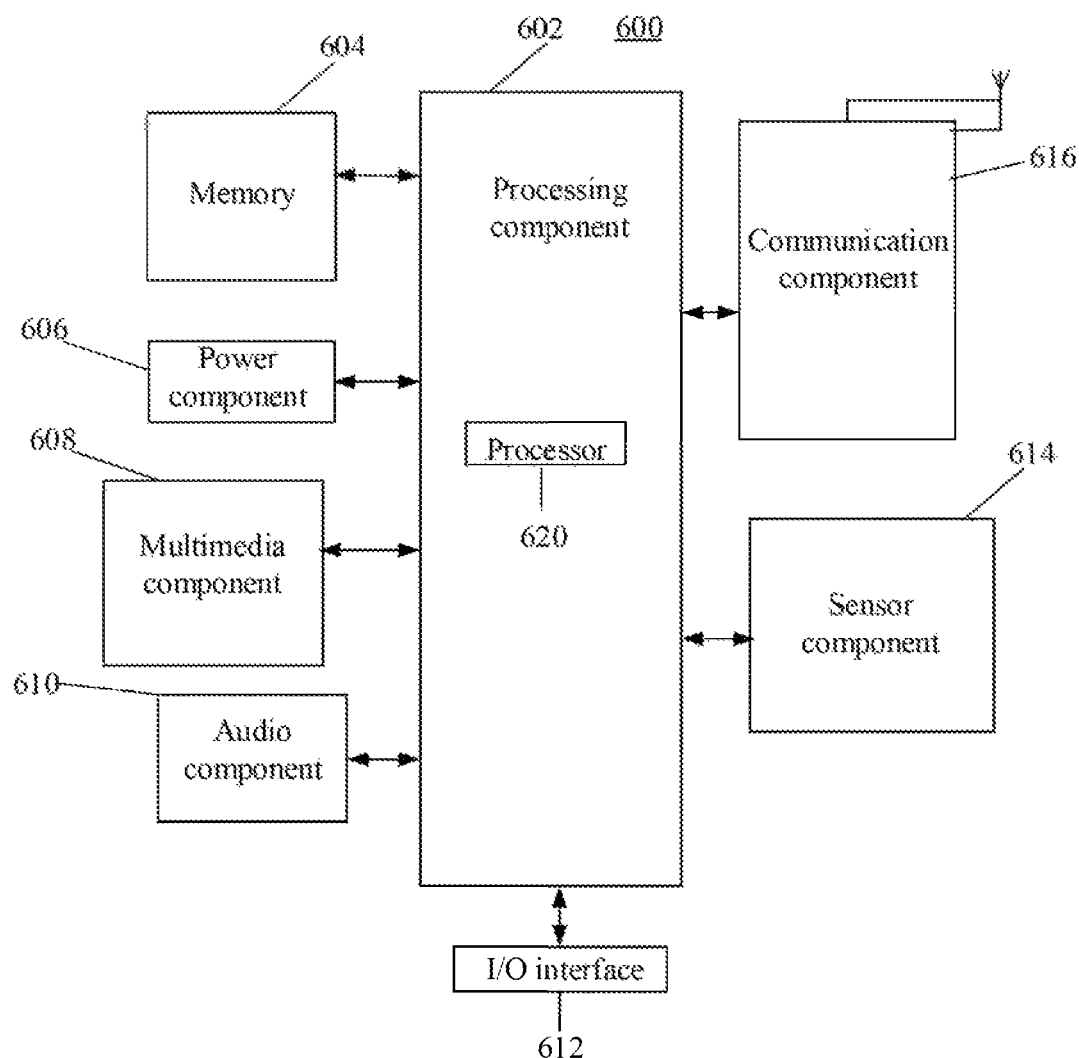
FIG. 7 is a block diagram of a device for cellular network signal measurement according to an embodiment of the present disclosure.

FIG. 7 is a block diagram of a device for cellular network signal measurement 600 according to an embodiment of the present disclosure. The device 600 is applied to a UAV. As illustrated in FIG. 7, the device for cellular network signal measurement 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device for cellular network signal measurement 600, such as the operations associated with display, telephone calls, data communications camera operations, and recording operations. The processing component 602 may include one or more processors 620 to execute instructions to perform all or part of the steps in the abovementioned method. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operation of the device for cellular network signal measurement 600. Examples of such data include instructions for any applications or methods operated on the device for cellular network signal measurement 600, contact data, phonebook data, messages, pictures, video, etc. The memory 604 may be implemented by any type of volatile or non-transitory memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 606 provides power for various components of the device for cellular network signal measurement 600. The power component 606 may include a power management system, one or more power supplies, and other components associated with generation, management and distribution of power for the device for cellular network signal measurement 600.

The multimedia component 608 includes a screen providing an output interface between the device for cellular network signal measurement 600 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 608 includes a front camera and/or a rear camera. The front camera and/or the rear camera may receive external multimedia data when the device for cellular network signal measurement 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a microphone (MIC), and the MIC is configured to receive an external audio signal when the device for cellular network signal measurement 600 is in the operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and a peripheral interface module, and the peripheral interface module may be a keyboard, a click wheel, a button and the like. The button may include, but not limited to: a home button, a volume button, a starting button and a locking button.

The sensor component 614 includes one or more sensors configured to provide status assessment in various aspects for the device for cellular network signal measurement 600. For instance, the sensor component 614 may detect an on/off status of the device for cellular network signal measurement 600 and relative positioning of components, such as a display and small keyboard of the device for cellular network signal measurement 600, and the sensor component 614 may further detect a change in a position of the device for cellular network signal measurement 600 or a component of the device for cellular network signal measurement 600, presence or absence of contact between the user and the device for cellular network signal measurement 600, orientation or acceleration/deceleration of the device for cellular network signal measurement 600 and a change in temperature of the device for cellular network signal measurement 600. The sensor component 614 may include a proximity sensor configured to detect presence of an object nearby without any physical contact. The sensor component 614 may also include a light sensor, such as a complementary metal oxide semiconductor (CMOS) or charge coupled device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wireless communication between the device for cellular network signal measurement 600 and another device. In the embodiment of the present disclosure, the communication component 616 may access a communication-standard-based wireless network, for example, 2nd-Generation (2G), 3G, 4G, 5G or a combination thereof, thereby implementing cellular network signal measurement. In an embodiment of the present disclosure, the communication component 616 receives a broadcast signal or broadcast associated information from an external broadcast management system through a broadcast channel. In at least one alternative embodiment, the communication component 616 further includes a near field communication (NFC) module. For example, the NFC module may be implemented based on a radio frequency identification (RFID) technology, an infrared data association (IrDA) technology, an ultra-wide band (UWB) technology, a bluetooth (BT) technology and another technology.

In an embodiment of the present disclosure, the device for cellular network signal measurement 600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the cellular network signal measurement method.

In an embodiment of the present disclosure, there is also provided a non-transitory computer-readable storage medium including an instruction, such as the memory 604 including an instruction, and the instruction may be executed by the processor 620 of the device for cellular network signal measurement 600 to implement the method for cellular network signal measurement. For example, the non-transitory computer-readable storage medium may be a ROM, a random access memory (RAM), a compact disc read-only memory (CD-ROM), a magnetic tape, a floppy disc, an optical data storage device and the like.

Figure 8:
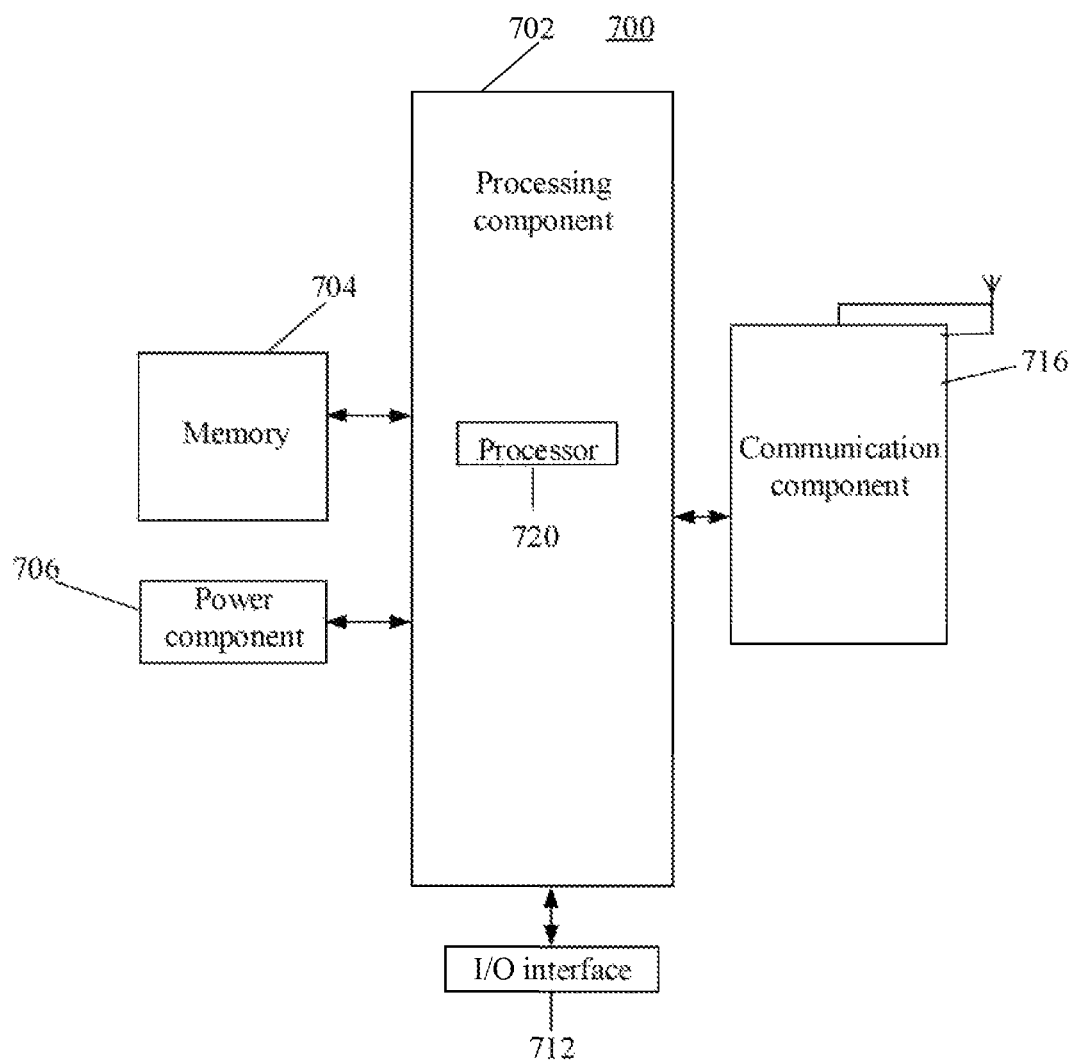
FIG. 8 is a block diagram of a device for cellular network signal measurement according to an embodiment of the present disclosure.

FIG. 8 is a block diagram of a device for cellular network signal measurement 700 according to an embodiment of the present disclosure. The device 700 is the abovementioned base station. As illustrated in FIG. 8, the device for cellular network signal measurement 700 may include one or more of the following components: a processing component 702, a memory 704, a power component 706, an I/O interface 712 and a communication component 716.

The processing component 702 typically controls overall operations of the device for cellular network signal measurement 700, such as the operations associated with display, telephone calls, data communications, camera operations, and recording operations. The processing component 702 may include one or more processors 720 to execute instructions to perform all or part of the steps in the abovementioned method. Moreover, the processing component 702 may include one or more modules which facilitate interaction between the processing component 702 and the other components. For instance, the processing component 702 may include a multimedia module to facilitate interaction between the multimedia component 708 and the processing component 702.

The memory 704 is configured to store various types of data to support the operation of the device for cellular network signal measurement 700. Examples of such data include instructions for any applications or methods operated on the device for cellular network signal measurement 700, contact data, phonebook data, messages, pictures, video, etc. The memory 704 may be implemented by any type of volatile or non-volatile memory devices, or a combination thereof, such as an SRAM, an EEPROM, an EPROM, a PROM, a ROM, a magnetic memory, a flash memory, and a magnetic or optical disk.

The power component 706 provides power for various components of the device for cellular network signal measurement 700. The power component 706 may include a power management system, one or more power supplies, and other components associated with generation, management and distribution of power for the device for cellular network signal measurement 700.

The I/O interface 712 provides an interface between the processing component 702 and a peripheral interface module, and the peripheral interface module may be a keyboard, a click wheel, a button and the like. The button may include, but not limited to: a home button, a volume button, a starting button and a locking button.

The communication component 716 is configured to facilitate wireless communication between the base station and another device. In the embodiment of the present disclosure, the communication component 716 may provide a communication-standard-based wireless network, for example, 2G, 3G, 4G, 5G or a combination thereof, thereby implementing connection with a terminal device.

In an embodiment of the present disclosure, the device for cellular network signal measurement 700 may be implemented by one or more ASICs, DSPs, DSPDs, PLDs, FPGAs, controllers, micro-controllers, microprocessors or other electronic components, and is configured to execute the cellular network signal measurement method.

In an embodiment of the present disclosure, there is also provided a non-transitory computer-readable storage medium including an instruction, such as the memory 704 including an instruction, and the instruction may be executed by the processor 720 of the device for cellular network signal measurement 700 to implement the method for cellular network signal measurement. For example, the non-transitory computer-readable storage medium may be a ROM, a RAM, a CD-ROM, a magnetic tape, a floppy disc, an optical data storage device and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for cellular network signal measurement, comprising:
   acquiring at least one set of measurement data collected during a flight of an unmanned aerial vehicle (UAV), each of the at least one set of measurement data comprising a base station identifier and a signal quality parameter and the base station identifier being an identifier of a base station for residing during collection of the measurement data; and
   sending the at least one set of measurement data to a base station, wherein the base station is the same as or different from the base station for residing during collection of the measurement data, and the at least one set of measurement data is used for determining whether the base station has a coverage vulnerability,
   wherein determining whether the base station has the coverage vulnerability comprises one of:
   when a flight path of the UAV is formed by connecting multiple coordinate points within a coverage area of a side lobe of the base station in series, determining, by the base station from the at least one set of measurement data, measurement data containing base station identifiers different from a base station identifier of the base station; and in response to determining that an amount of the measurement data containing the base station identifiers different from the base station identifier of the base station exceeds a set proportion, determining that the base station has the coverage vulnerability; or
   when each of the at least one set of measurement data further comprises a flight altitude and a geographical position, determining, by the base station, measurement data in a coverage area of a side lobe of the base station according to the flight altitude and the geographical position, and in response to determining that a base station identifier in the measurement data is different from a base station identifier of the base station, determining that the coverage area of the base station has the coverage vulnerability.

2. The method of claim 1, wherein each of the at least one set of measurement data further comprises at least one of the flight altitude or the geographical position.

3. The method of claim 1, further comprising:
   receiving a terminal information request message from the base station,
   wherein sending the at least one set of measurement data to the base station comprises:
   sending a terminal information response message to the base station, the terminal information response message comprising the at least one set of measurement data.

4. The method of claim 3, further comprising:
before receiving the terminal information request message from the base station, sending indication information to the base station, the indication information indicating that the UAV has collected the at least one set of measurement data.

5. The method of claim 4, wherein sending the indication information to the base station comprises:
sending, to the base station, a radio resource control (RRC) connection setup complete message carrying the indication information.

6. The method of claim 1, further comprising:
receiving a logged measurement configuration message from the base station, the logged measurement configuration message indicating a configuration parameter for minimization of drive tests (MDT) in a cellular network; and
collecting the measurement data according to the configuration parameter indicated through the logged measurement configuration message.

7. The method of claim 6, wherein the configuration parameter comprises data required to be collected and data required to be uploaded to the base station.

8. The method of claim 6, further comprising:
sending terminal capability information to the base station, the terminal capability information indicating that the UAV has an MDT function.

9. A method for cellular network signal measurement, comprising:
receiving, by a base station, at least one set of measurement data from a terminal device, each of the at least one set of measurement data comprising a base station identifier and a signal quality parameter and the base station identifier being an identifier of a base station where the terminal device resides during collection of the measurement data,
wherein the base station is the same as or different from the base station where the terminal device resides during collection of the measurement data, and the at least one set of measurement data is used for determining whether the base station has a coverage vulnerability,
wherein determining whether the base station has the coverage vulnerability comprises one of:
when a flight path of the terminal device is formed by connecting multiple coordinate points within a coverage area of a side lobe of the base station in series, determining, by the base station from the at least one set of measurement data, measurement data containing base station identifiers different from a base station identifier of the base station; and in response to determining that an amount of the measurement data containing the base station identifiers different from the base station identifier of the base station exceeds a set proportion, determining that the base station has the coverage vulnerability; or
when each of the at least one set of measurement data further comprises a flight altitude and a geographical position, determining, by the base station, measurement data in a coverage area of a side lobe of the base station according to the flight altitude and the geographical position, and in response to determining that a base station identifier in the measurement data is different from a base station identifier of the base station, determining that the coverage area of the base station has the coverage vulnerability.

10. The method of claim 9, wherein each of the at least one set of measurement data further comprises at least one of the flight altitude or the geographical position.

11. A device for cellular network signal measurement, comprising:
a processor, configured to acquire at least one set of measurement data collected during a flight of an unmanned aerial vehicle (UAV), each of the at least one set of measurement data comprising a base station identifier and a signal quality parameter and the base station identifier being an identifier of a base station for residing during collection of the measurement data; and
a transceiver, configured to send the at least one set of measurement data to a base station, wherein the base station is the same as or different from the base station for residing during collection of the measurement data, and the at least one set of measurement data is used for determining whether the base station has a coverage vulnerability,
wherein the at least one set of measurement data is further used for one of:
when a flight path of the UAV is formed by connecting multiple coordinate points within a coverage area of a side lobe of the base station in series, the at least one set of measurement data is used for the base station to determine measurement data containing base station identifiers different from a base station identifier of the base station; and in response to determining that an amount of the measurement data containing the base station identifiers different from the base station identifier of the base station exceeds a set proportion, determining that the base station has the coverage vulnerability; or
when each of the at least one set of measurement data further comprises a flight altitude and a geographical position, the at least one set of measurement data is used for the base station to determine measurement data in a coverage area of a side lobe of the base station according to the flight altitude and the geographical position, and in response to determining that a base station identifier in the measurement data is different from a base station identifier of the base station, determining that the coverage area of the base station has the coverage vulnerability.

12. The device of claim 11, wherein each of the at least one set of measurement data further comprises at least one of the flight altitude or the geographical position.

13. The device of claim 11, wherein the transceiver is further configured to:
receive a terminal information request message from the base station; and
send a terminal information response message to the base station, the terminal information response message comprising the at least one set of measurement data.

14. The device of claim 13, wherein the transceiver is further configured to:
before receiving the terminal information request message from the base station, send indication information to the base station, the indication information indicating that the UAV has collected the at least one set of measurement data.

15. The device of claim 14, wherein the transceiver is configured to send a radio resource control (RRC) connection setup complete message carrying the indication information to the base station.

16. The device of claim 11, wherein the transceiver is configured to receive a logged measurement configuration message from the base station, the logged measurement configuration message indicating a configuration parameter for minimization of drive tests (MDT) in a cellular network; and the processor is further configured to collect the measurement data according to the configuration parameter indicated through the logged measurement configuration message.

17. The device of claim 16, wherein the transceiver is further configured to send terminal capability information to the base station, the terminal capability information indicating that the UAV has an MDT function.

18. The device of claim 16, wherein the configuration parameter comprises at least one of the following:
   a job type of MDT, which is logged MDT only;
   an area scope including two types: one being a cell and the other being a tracking area;
   a list of measurements defining a content of the signal quality parameter to be RSRP or RSRQ;
   a reporting trigger, one being periodic reporting and the other being event-triggered reporting;
   a logging interval; or
   a logging duration.

19. A base station for cellular network signal measurement, comprising:
   a transceiver, configured to receive at least one set of measurement data from a terminal device, each of the at least one set of measurement data comprising a base station identifier and a signal quality parameter and the base station identifier being an identifier of a base station where the terminal device resides during collection of the measurement data,
   wherein the base station is the same as or different from the base station where the terminal device resides during collection of the measurement data, and the at least one set of measurement data is used for determining whether a base station has a coverage vulnerability; and
   a processor, configured to:
   when a flight path of the terminal device is formed by connecting multiple coordinate points within a coverage area of a side lobe of the base station in series, determine, from the at least one set of measurement data, measurement data containing base station identifiers different from a base station identifier of the base station; and in response to determining that an amount of the measurement data containing the base station identifiers different from the base station identifier of the base station exceeds a set proportion, determine that the base station has the coverage vulnerability; or
   when each of the at least one set of measurement data further comprises a flight altitude and a geographical position, determine measurement data in a coverage area of a side lobe of the base station according to the flight altitude and the geographical position, and in response to determining that a base station identifier in the measurement data is different from a base station identifier of the base station, determine that the coverage area of the base station has the coverage vulnerability.

* * * * *